United States Patent
Maino et al.

(10) Patent No.: US 8,635,448 B2
(45) Date of Patent: Jan. 21, 2014

(54) SECURE PREFIX AUTHORIZATION WITH UNTRUSTED MAPPING SERVICES

(75) Inventors: Fabio Maino, Palo Alto, CA (US); Vina Ermagan, San Jose, CA (US); Alberto Cabellos Aparicio, Barcelona (ES)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 13/311,976

(22) Filed: Dec. 6, 2011

(65) Prior Publication Data

US 2013/0145152 A1    Jun. 6, 2013

(51) Int. Cl.
*H04L 9/00* (2006.01)

(52) U.S. Cl.
USPC .......................................................... 713/156

(58) Field of Classification Search
USPC .......................................................... 713/156
See application file for complete search history.

(56) References Cited

U.S. PATENT DOCUMENTS

| | | | |
|---|---|---|---|
| 6,751,729 B1* | 6/2004 | Giniger et al. ................ | 713/153 |
| 6,826,690 B1* | 11/2004 | Hind et al. ..................... | 713/186 |
| 7,237,260 B2* | 6/2007 | Yu et al. ........................ | 713/153 |
| 2002/0049902 A1* | 4/2002 | Rhodes ......................... | 713/153 |
| 2002/0052200 A1* | 5/2002 | Arkko et al. .................. | 455/432 |
| 2002/0075807 A1 | 6/2002 | Troxel | |
| 2005/0138359 A1* | 6/2005 | Simon et al. .................. | 713/156 |
| 2007/0113075 A1 | 5/2007 | Jo et al. | |
| 2009/0161668 A1* | 6/2009 | Mullooly et al. ............. | 370/389 |
| 2009/0238193 A1* | 9/2009 | Nishida et al. ................ | 370/401 |
| 2011/0072157 A1* | 3/2011 | Liu et al. ....................... | 709/242 |

FOREIGN PATENT DOCUMENTS

| | | |
|---|---|---|
| EP | 18411431 A1 | 10/2007 |
| WO | WO 2005/006663 A1 | 1/2005 |

OTHER PUBLICATIONS

Bolla et al., "A Cooperative Middleware for Distributed SW Routers", IEEE, dated Jul. 11, 2010, 8 pages.
European Patent Office, "Search Report" in application No. PCT/US2012/068025, dated Mar. 25, 2013, 8 pages.
Current Claims in application No. PCT/US2012/068025, dated Mar. 2013, 4 pages.
European Patent Office, "Search Report" in application No. PCT/US2012/068025, dated Jun. 3, 2013, 15 pages.
Current Claims in application No. PCT/US2012/068025, dated Jun. 2013, 4 pages.

* cited by examiner

*Primary Examiner* — Matthew Smithers
(74) *Attorney, Agent, or Firm* — Hickman Palermo Truong Becker Bingham Wong LLP

(57) ABSTRACT

In one embodiment, a first router associated with a first network node sends a first map lookup that includes a particular device identifier associated with a second network node to a mapping service that maintains a plurality of mappings that associate device identifiers with device locations. The first router receives, from a second router associated with the second network node, a map response that includes a particular device location that corresponds to the particular device identifier for the second network node. The first router establishes a secure session with the second router, and determines, based on the secure session, whether the second router is authorized to reply for the particular device identifier associated with the second network node.

18 Claims, 5 Drawing Sheets

SECURE PREFIX AUTHORIZATION WITH UNTRUSTED MAPPING SERVICES

TECHNICAL FIELD

The present disclosure relates to network address mapping systems, and more specifically, to security systems for network address mapping systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various protocols and standards have been proposed and developed to facilitate communications between users and devices over the Internet. Some of the approaches use an IP address or a MAC address of a device to indicate two things, the identity of the device, and the location of the device.

However, in some situations, using an IP or MAC address to indicate both an identity and a location of a device can cause problems. For example, as a mobile device moves from one location to another, the MAC address of the mobile device remains the same, while the device location changes. Hence, using the device MAC address can be insufficient to determine the device actual location.

Often software applications rely on a device address as determinative for both the device identity and location. For example, an application that facilitates data communications over a TCP session can rely on an IP address of the device to establish the TCP session. However, relying only on the device IP address prevents the TCP-based application to seamlessly continue execution.

Further, if a network device starts using another port to communicate with the Internet, then the device receives a new IP address, even though the physical location of the device has not changed, causing problems in maintaining one, continuous communications session for the device. Hence, using a device address to indicate the device identity and the device location may be inaccurate.

Furthermore, even if accurate information about a device location is obtainable, procuring such information is often prone to security attacks.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
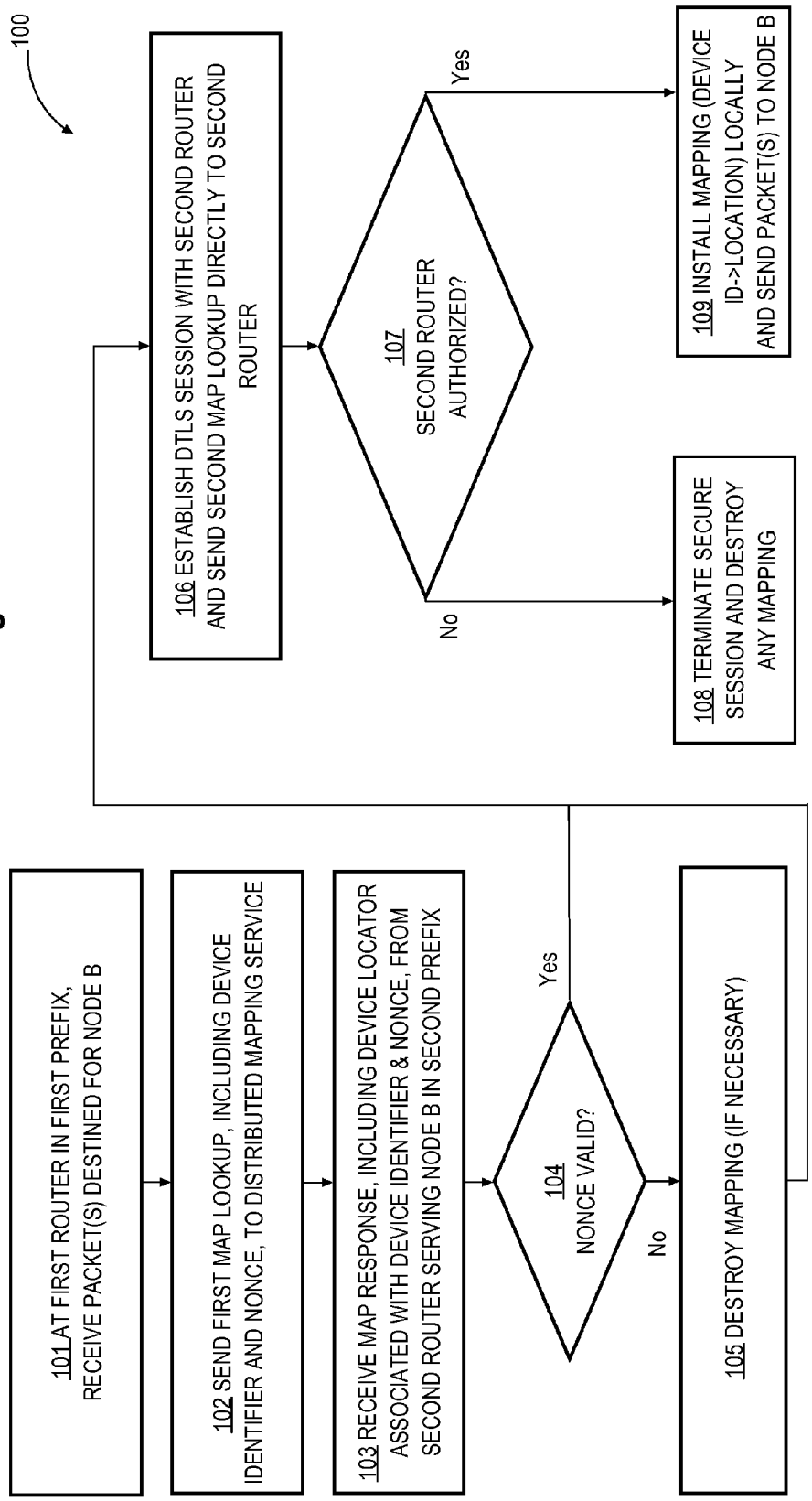
FIG. 1 illustrates one example of a method for securing a network address mapping system using a one-time key.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Examples of Secure Network Address Mapping Systems
   3.1 Securing a Network Address Mapping System Using a One-Time Key
   3.2 Securing a Network Address Mapping System Using a PKI-key
4.0 Implementation Mechanisms—Hardware Overview
5.0 Extensions and Alternatives 1.0 Overview In an embodiment, a process is configured to secure semi-trusted distributed mapping systems with a certificate-based protocol. In an embodiment, an identity of a device is separated from location information of the device. The device identity, which is referred herein for one embodiment as an identity, and the device location, which is referred to for one embodiment as a location, are split into two different namespaces, and separate network addresses are used for the identity and location.

Separating addresses for an identity and location functions provides the benefit of improved scalability of the routing system, greater aggregation of locations and improved multi-homing efficiency an ingress traffic engineering. The separation of the identity from the location allows overcoming some of the problems that many Internet applications are experiencing.

In an embodiment, an approach for representing information capturing a device identity and a device location is presented. In one implementation, a packet sent from a device comprises IP address information for the device and location information for the device. The IP address information corresponds to conventional device identification based on the device IP address and is directly known to the device. However, the location information is determined by a router that is configured to determine a physical location of the device at a particular time, and that uses and maintains a mapping.

For example, a user located in one conference room in a particular building uses a mobile device to connect to a network. The router servicing the device connection can determine the location of the mobile device at a given moment. As the user and the mobile device move to another conference room in the same building, the router can determine a new location of the mobile device, and update the location information of the mobile device in a database maintained by the network.

Routers servicing access of a mobile device to a network can determine a current location of the mobile device at any particular time. Although the IP address and/or MAC address of the mobile device do not change, changes in the location of the mobile device can be tracked by the routers in the network.

In an embodiment, the approach is based upon continuity of a session, such a TCP session, even though a mobile device has changed its location. Hence, from the perspective of an application supporting the TCP session established for the mobile device, a continuous TCP session can be maintained even if the mobile device changes location. Relying on the device IP address, provided by the device, and the device location identification, provided by the routers, the TCP supporting application can continue execution.

In an embodiment, the identity of the device is separated from the location of the device. While the identity can still be represented by an IP address of the device, the location of the device is determined by a router or server that communicates with the device.

Separating the device identity from the device location as provided herein can prevent a failure of an application that relies on accurate information of the device location, and that would have failed if only an IP address of the device was provided as the device identification information.

Separation of the identity information of the device from the location information of the device allows an application that relies on the identity information of the device to continue binding to the identity information. Hence, when the mobile device moves to another location, another router detects and updates the location information of the device, but the identity information of the device does not need to be updated. This improves session continuity regardless of mobility of the device. The associations between the device identity information and the device location information can be stored in a mapping maintained by a mapping system.

In an embodiment, a one-time key can be used to secure access to a distributed mapping system. The one-time key can be applicable to mapping systems that are considered secure. The one-time key can be used to secure, for example, location information obtained from the mapping system before the location information is provided to a requestor.

In an embodiment, a public key infrastructure (PKI)-based security process is used to secure a mapping system to protect the mapping system from security breach attacks targeted at entities present within the mapping system.

A PKI-based approach can be used to authenticate entities of the mapping system. For example, the PKI-based approach can allow verifying whether location information obtained for a particular identity was provided by the entity that is authorized to communicate with the mapping system and is authorized to provide the location information to other entities.

2.0 Structural and Functional Overview

Figure 4:
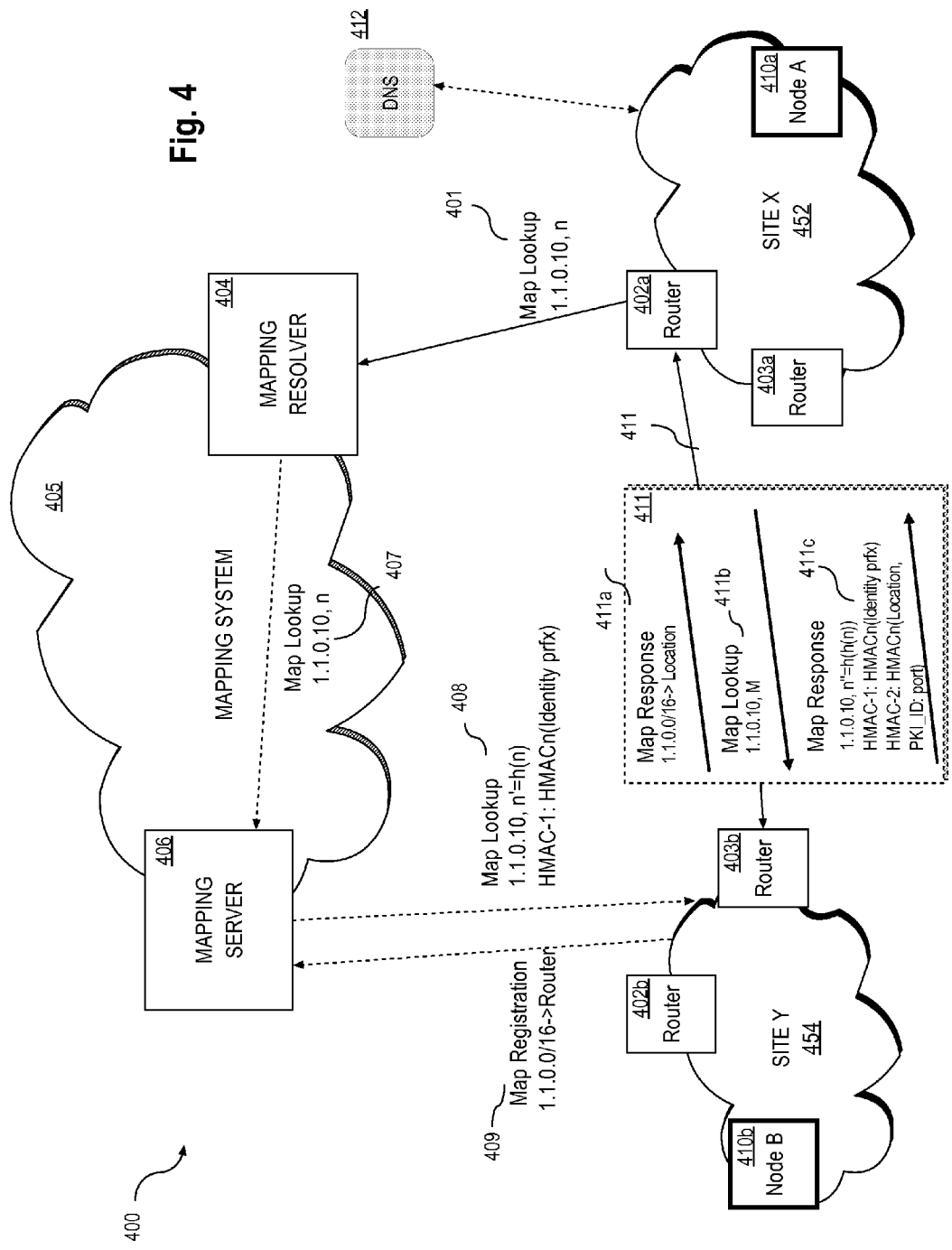
FIG. 4 illustrates one example of a network address mapping system.

FIG. 4 illustrates one example of a network address mapping system 400. In an embodiment, a mapping system 400 comprises a site 452 (site X), a mapping system 405 and site 454 (site Y). In practical embodiments, additional sites 452 and 454, and additional alternative topologies 405 can be present in mapping system 400.

In an embodiment, a site 452 comprises one or more nodes A 410a, one or more ingress tunnel routers 402a, and one or more egress tunnel routers 403a. Node A 410a can communicate with one or more Domain Name Systems (DNS) 412, from which node 410a can request and obtain one or more Internet Protocol (IP) addresses. Furthermore, node 410a can communicate with any other node in site 452, and any node in site 454 via connection 411.

One or more ingress tunnel routers 402a are responsible for interfacing with a mapping system 405, while one or more egress tunnel routers 403a are responsible for receiving information from mapping system 405.

In an embodiment, a site 454 comprises one or more nodes B 410b, one or more ingress tunnel routers 402b, and one or more egress tunnel routers 403b. Node B 410b can communicate with any other node in site 454, and any node in site 452 via connection 411.

One or more ingress tunnel routers 402b are responsible for interfacing with a mapping system 405, while one or more egress tunnel routers 403b are responsible receiving information from mapping system 405.

If node 410a requests establishing a communications connection 411 with node 410b, then an ingress tunnel router 402a establishes the communications connection 411 with an egress tunnel router 403b. However, in an embodiment, to obtain current location information for node 410b, prior to establishing the connection 411, ingress tunnel router 402a establishes a tunnel via a mapping system 405, which is not known to nodes 410a and 410b, but which allows ingress tunnel router 402a to obtain the current location information for node 410b.

In an embodiment, an ingress tunnel router 402a is configured to establish a tunnel between site 452 and site 454, wherein the tunnel includes a mapping system 405.

In an embodiment, a tunnel between site 452 and site 454 via a mapping system 405 is a virtual tunnel, existence of which is not communicated to devices in site 452 and devices in site 454. Hence, if for example, node 410a communicates with node 410b, then ingress tunnel router 402a and egress tunnel router 403b can set up a tunnel via a mapping system 405.

In an embodiment, a mapping system 405 comprises one or more mapping resolvers 404 and one or more mapping servers 406. In some implementations, mapping system 405 can be a distributed system comprising a variety of servers, including one or more mapping resolvers 404, one or more mapping servers 406 and other servers, communicatively coupled with each other.

Mapping resolvers 404 and mapping servers 406 are responsible for creating and maintaining a mapping between identity information and location information for devices present in sites 452 and 454.

In an embodiment, a mapping resolver 404 receives a request to resolve a location of a device, processes the request to obtain the requested location information, and returns the location information of the device to a requestor.

A mapping resolver 404 resolves location information issues for the devices for which the device identification is known. For example, upon providing an IP address of a particular device, mapping server 404 of the mapping system 405 can determine information of the current location of the particular device.

In an embodiment, a mapping server 406 maintains mappings between identification information and location information for devices in a network, and is configured to provide location information of the devices when such information is requested.

In an embodiment, mapping resolver 404 and mapping server 406 cooperate with each other to provide responses to requests for location information of network devices. The process of receiving a request, processing the request and obtaining a response for the request can be analogized to the process executed by a device such as a Domain Name System (DNS), with the exception that the DNS processes requests for IP addresses, while mapping resolver 404 and mapping server 406 process requests for location information.

In an embodiment, a network address mapping system 400 comprises, or cooperates with, a plurality of tunnel routers, such as two or more ingress tunnel routers 402a, 402b, and two or more egress tunnel routers 403a, 403b. Tunnel routers are responsible for establishing tunnels between the routers and for encapsulating location information requests and responses.

In an embodiment, a virtual tunnel is established via a mapping system 405 in such a way that the end-nodes, such as nodes 410a, 410b, are unaware of existence of the tunnels.

For example, for node 410b and node 410a, an egress tunnel router 403b can establish a tunnel with an ingress tunnel router 402a in such a way and nodes 410a, 410b are unaware of existence of the tunnel.

Implementation of the presented approach can be based on any of several data communications protocols, including TCP/IP, in which the devices can exchange data in the form of packets (as in IP) or segments (as with TCP). Therefore, in the description below, the references to data packets can be also understood as references to data segments that contain packets.

In an embodiment, the end-nodes, such as a node A 410a, and a node B 410b, are not aware of the difference between an identity and an IP address, both of which can be assigned to each respective node. For example, while generating a data packet or segment intended to node A 410a, node B 410b can include an IP address of node 410a into a header of the packet/segment without knowing whether the included IP address is indeed the IP address assigned to node 410a or merely an identity assigned to node 410a.

The distinction between an identity and an IP address is not used directly by the nodes; however, the tunnel routers, such as egress tunnel routers 403a/b and ingress tunnel routers 402a/b do use the different values.

In an embodiment, tunnel routers are responsible for determining whether a received data packet comprises identity information of an end-point node or an IP address of the end-point node. For example, upon receiving a data packet from end-point 410b and destined to end-point node 410a, an egress tunnel router 403b determines whether the data packet comprises an identity of node 410a or an IP address of node 410a.

If the received packet comprises an end-point identifier of a destination node, then the tunnel router transmits the end-point identifier of the destination node to mapping resolver 404 to determine the location of the destination node. Once mapping resolver 404 (in cooperation with mapping server 406) determines the location of the destination node, the location information of the destination node is transmitted to the tunnel router. The tunnel router encapsulates the received packet to include the location information of the destination node, and forwards the encapsulated packet to the destination.

However, if the received packet comprises the IP address of a destination node, then the tunnel router transmits the received packet to the destination according to the IP address already included in the received packet.

Separating the identity from the location enables endpoint mobility. For example, a mobile node 410b can be statically provisioned with an identity that is used for all its connections. Packets with headers from the identity namespace can be encapsulated in an outer header from the location space by the mobile node 410b, creating a tunnel to a destination site. A packet is routed based on the outer header to the destination site. Once the packet arrives at the destination site, the outer header of the packet is removed and the packet is delivered to the end host or an application.

In an embodiment, a mapping system stores associations between identity and location. In an embodiment, the mapping is designed to withstand manipulations of the mapping by an adversary. The mapping is protected from situations in which the adversary is able to redirect traffic and disrupt reliability and safety of the network.

In an embodiment, identity-location mappings are secured, especially if the mapping is updated dynamically, which is the case for mobile devices. For example, a location associated with an identity of a mobile node changes as the mobile node is moved from one location to another, and thus the mapping between the identity and location is frequently updated to reflect the current location of the mobile device. It could be difficult to distinguish the legitimate updates of the location information performed by the mapping system from illegitimate updates of the location information performed by an adversary.

Security measures for a mapping system can be provided in a variety of ways. In an embodiment, the security measures are implemented using a map registration and securing mapping-response messages.

In an embodiment, to support the usage of node identifiers by tunnel routers, nodes in the network need to register with a mapping system. An identity can be originally assigned to a node or device using a process that is similar to assigning an IP address to a device. For example, an identity can be assigned using a Dynamic Host Configuration Protocol (DHCP). DHCP allows network devices to automatically obtain a valid IP address from a server. DHCP can also allow a node or a device to automatically obtain a valid identity from a server. In fact, DHCP can be configured in such a way that DHCP does not distinguish between an IP address and an identity.

To register, a node provides to the mapping system the node identity information and the node location information. For example, a mobile device 410b can register its own identity and location into an associated mapping server 406 via a Map Registration message. Mapping server 406 can be an authoritative entity for the identity, and can be configured to be able to verify the delegation, authenticity and integrity of the registration.

For example, an egress node 403b can initiate a registration process with a mapping system by sending a Map Registration message 409 to mapping server 406, provide its identity and location information in the message, and request that the identity and location information be registered by mapping server 406. In the example depicted in FIG. 4, Map Registration message 409 comprises an identity information as a prefix 1.1.0.0/16 and location information.

Upon receiving a Map Registration message 409, mapping server 406 registers the received an identity and location information in a database on a server or any other data storage structure.

In an embodiment, a correspondent node (CN) performs a DNS lookup in order to find the identity of the node and start sending packets destined the node using the identity.

If a router 402a does not have already a mapping entry for the identity in its cache, then the router 402a can perform a lookup in the mapping system. The router 402a can accomplish that by sending a Map Lookup message 401 to a mapping resolver 404. In the example depicted in FIG. 4, the Map Lookup message 401 comprises an identity prefix "1.1.0.10" and "n" corresponding to a nonce, described below.

A Map Lookup message 401 comprising an identity prefix and a nonce is carried over a mapping system 405 to a mapping server 406.

In an embodiment, a mapping server 406 receives a Map Lookup message 407, comprising an identity, and resolves the location information for the identity.

In an embodiment, to resolve location information for the provided identity, a mapping server 406 obtains the location information associated with the provided identity, includes the location information into a Map Lookup 408 and sends the Map Lookup message 408 to egress tunnel router 403b.

Upon identifying the location information associated with the identity, mapping server 406 transmits a Map Lookup 408 to an egress tunnel router 403b. As described below, the Map Lookup message 408 can comprise a hash of a nonce (denoted as n'=h(n)). Furthermore the Map Lookup message 408 can comprise encrypted information, denoted as HMAC-1. The process of generating HMAC-1 is described below.

In an embodiment, upon receiving a Map Lookup message 408, an egress tunnel router 403b sends the Map Lookup message 408 as a Map Response message 411a to an ingress tunnel router 402a to provide location information corresponding to a particular identity.

Alternatively, upon receiving a Map Lookup message 408, an egress tunnel router 403b encrypts content of the message before sending the message as a Map Response to an ingress tunnel router 402a. For example, using a nonce hash n'=h(n), the egress tunnel router can encrypt the location information included in the message, generate HMAC-2 (described below) and send a Map Response message 411c comprising the hashed nonce (n'=h(n)), HMAC-1 generated by a mapping server 406, and HMAC-2 generated by the egress tunnel router 403b.

In an embodiment, a Map Response message 411c also includes a PKI-ID and a port identifier. The PKI-ID is a Public Key Infrastructure (PKI) identifier that indicates the PKI that is used to certify an egress tunnel router 403b. For example, the PKI-ID can indicate a Certification Authority (CA) that issued the keys.

A port identifier is an identifier of the port on which an egress tunnel router 403b can receive inquires about a certificate given to the egress tunnel router. For example, if after receiving a Map Response message 411c, an ingress tunnel router 402a wants to verify whether egress tunnel router 403b was authorized to communicate with a mapping system, then the ingress tunnel router 402a can send a respective inquiry to the egress tunnel router port indicated by the port identifier included in the Map Response message 411c. Details about verifying authorization of the egress tunnel router are provided in reference to FIG. 2.

In an embodiment, once an ingress tunnel router 402a determined that content of the received message was compromised and that the message was received from an authorized entity, then ingress tunnel router 402a starts encapsulating data packets in a data plane and transmitting the data packets to the intended destination.

In an embodiment, a Map Response 411 (a, b or c) includes routing location information, and optionally weights and priorities associated with the particular mapping.

If a mobile device, for example node 410b, changes its location, the mobile device can generate another Map Registration message 409, in which the mobile device can provide its identity and updated location information. The Map Registration message 409 is received by mapping server 406. Mapping server 406 updates the mapping information for the identity and updates the location information associated with the identity.

Once the location information associated with a particular identity is registered or updated in a mapping system, the location information is used in encapsulation of the data packets destined to the site that includes the node identified by the particular identity.

In an embodiment, forwarding of data packets is performed in a data plane of a router, while encapsulating of the data packets is performed in a control plane of the router. In an embodiment, processing in the control plane needs to be secured.

3.0 Examples of Secure Network Address Mapping Systems

In an embodiment, the security processes for a mapping system have the effect of providing authentication of involved parties, such as a mapping resolver 404, a mapping server 406, routers 402a/b and 403a/b, and ensuring that the involved parties are authorized to provide mapping information and services. For example, it may be desirable to secure the mapping system from impersonators who would want to intercept information about the mapping system and interfere with the functionalities of the mapping system. It also may be desirable to prevent the unauthorized entities from manipulating the mapping system, the information stored by the mapping servers and the update information provided to the mapping servers.

In some circumstances, it can be assumed that a mapping system is secure and well functioning, and thus delivers Map Lookup messages to their intended destinations. Alternatively, it can be assumed that the packets are transmitted to locations other than the intended destinations.

Furthermore, the secure approach herein may assume that no man-in-the-middle attack can be carried out against the mapping system via GRE tunnels, and that the information included in the Map Lookup messages, including a nonce, cannot be read by third-party entities. Such an assumption may be reasonable when the tunnels are secure, or if the tunnels are deployed using GRE and IPSec, and thus provide enhanced confidentiality to the mapping system.

In an embodiment, additional security mechanisms are directed to preventing attacks on a mapping system from the entities that are located outside of the mapping system as well as from the man-in-the-middle entities that can be located within the mapping system.

In an embodiment, a mapping system is implemented for IP prefixes, not necessarily for just individual IP addresses. Implementing the mapping system to handle the IP prefixes may make the mapping system robust and efficient. For example, if an identity is expressed as a prefix 1.1.0.0/32, a typical server would send the largest IP prefix that corresponds to the 1.1.0.0./32. Hence, if a next request is for an identity prefix specified as 1.1.0.0./32, then a tunnel router can rely on the information already received for the prefix 1.1.0.0./32.

In an embodiment, a mapping system utilizes additional parameters associated with IP addresses and IP prefixes. For example, the mapping system can utilize particular values for a time-to-live parameter, a freshness indicator and other parameters. For example, for a mobile device, a value for the time-to-live parameter can be relatively small as the mobile device is expected to change its location frequently.

In an embodiment, security mechanisms are designed to prevent an attack where a tunnel router claims an identity that it does not own by providing a location for it in a mapping response message.

For example, if an intruder (attacker) intercepts a Map Registration message, alters the information included in the Map Registration message, and sends the altered messages to a mapping system, then the mapping system could receive two or more Map Registered messages that would indicate two or more different locations of a particular device. The information stored in the mapping system database would be built from incoherent information.

According to another example, if an intruder intercepts a Mapping Response message, alters the information included in the Mapping Response message, and sends the altered message to a mapping system, then the intruder can be able to redirect the data traffic to his device, negatively impacting the security of the data communications.

According to other example, messages send to a mapping system from various sources, including intruders, can place high demands on bandwidth in a network. Sending a high volume of messages can stall communications within the network and negatively impact efficiency of the mapping system.

In an embodiment, various attacks on a mapping system can be combated using a one-time key approach and a PKI-key approach. Each of the approaches is separately described below.

3.1 Securing a Network Address Mapping System Using a One-Time Key

In an embodiment, it is assumed that a mapping system itself is trusted, but the nodes, devices and other entities communicating with the mapping system are untrusted.

One aspects of the security architecture is to provide a reasonable degree of security without adding too much complexity to a mapping system.

In an embodiment, securing a network address mapping system is based on a one-time key approach that implements a nonce. A nonce is a random number generated by a node or a tunnel router which initiates communications with a mapping system upon receiving one or more packets destined to a particular destination node.

In an embodiment, it is assumed that a connection between an ingress tunnel router and a mapping server is trusted and secured, and hence, a nonce can be securely transported in a message sent from the ingress tunnel router to the mapping server. Alternatively, if the connection between the ingress tunnel router and the mapping server is untrusted, then the nonce can be encrypted using a shared key which is known only to the ingress tunnel router and a mapping server.

However, once the message with the nonce is received by the mapping server, the mapping server has to secure the message before transmitting the message to an egress tunnel router. Because a connection between the mapping server and the egress tunnel router is assumed to be untrusted, the mapping server uses the nonce to encrypt content in the message and sends the message with the encrypted payload to the egress tunnel router. As an encryption key, the mapping server can use for example, a hash of the nonce, as will be described below. Hence, the nonce is referred to as a one-time-key.

A nonce itself (or a hash of the nonce) can be used to encrypt content of a message received at a mapping server before the message is sent from the mapping server to an egress tunnel router. Since the egress node does not know the one-time key (nonce), the egress node is unable to decrypt the content encrypted using the nonce. Hence, if the egress tunnel router is indeed untrusted, the egress node is unable to appreciate the content of the intercepted message.

FIG. 1 illustrates one example of a method for securing a network address mapping system 100 using a one-time key. At block 101, a first router, in a first prefix, receives one or more packets destined for node B. The term "first router" is used to indicate either any of the tunnel routers or an end-point node. For example, the first router can be an ingress tunnel router 402a/b, as depicted in FIG. 4, or an end-point node 410a/b (such as a mobile device), also depicted in FIG. 4.

Upon receiving the one or more packets destined for node B, the first router generates a nonce. In an embodiment, the nonce is a one-time key used to secure the messages sent to and received from a mapping system.

A nonce may be a randomly generated number. A nonce can be generated anew each time a tunnel router receives packets destined to a new destination. Alternatively, the nonce can be generated once per a communication session, a rebut cycle, or once for each particular network device. Other methods for timing the nonce generation can also be implemented.

In an embodiment, a nonce is stored locally in association with an identity for which the Map Lookup was generated. The nonce can be stored in a storage associated with a tunnel router that generated the Map Lookup message or any storage with which the tunnel router can communicate.

At block 102, the first router sends a first Map Lookup message to a distributed mapping service. The first Map Lookup comprises a device identifier, such as an identity and a nonce, both described above. In an embodiment, a randomly generated nonce (n) included in a message is transmitted in the clear (unencrypted).

Alternatively, the nonce can be encrypted. Usage of the encrypted nonce protects the message exchange from attacks described as man-in-the-middle attacks. The nonce can be encrypted using shared keys if a mapping server and an ingress tunnel router belong to the same domain. If the mapping server and the ingress tunnel router do not belong to the same domain (when, for example, the ingress tunnel router is a visiting device from a foreign network and dynamically obtained access to the mapping resolver), then other method of securing the path can be implemented.

In an embodiment, a key used to encrypt a nonce is shared between a first router, such as an ingress tunnel router, and a mapping server. The key can be used to protect integrity of the messages exchanged between the first router and the mapping server.

In an embodiment, an ingress tunnel router does not use a nonce as an encryption key. The nonce is carried to the mapping server in the message as information that a mapping server can use as a one-time key to encrypt the content of the message before the message is transmitted to an egress tunnel router. A mapping server uses the nonce as an encryption key to secure content of the message sent via a possibly unsecure connection between the mapping server and the egress tunnel router.

In an embodiment, upon receiving a Map Lookup message with an encrypted nonce, a mapping resolver decrypts the nonce and forwards the Map Lookup message to a mapping system as a decrypted message. In particular, the Map Lookup message is sent to a mapping server.

In an embodiment, a nonce (n) can be used as a key to encrypt an identity prefix and to generate HMAC. Hence, the nonce (n) represents a one-time key, shared between the ingress tunnel router and a mapping system, including both a mapping resolver and a mapping server.

The nonce is called a one-time key because it is used only once; it is used only to obtain location information for a particular identity. Each time a new Map Lookup message is generated, a new nonce can be generated and shared by an ingress tunnel router and a mapping system.

However, a nonce (shared secret) is not known and is not disclosed to an egress tunnel router because it is assumed that the egress tunnel system is an untrusted entity. For example, if an attacker gains access to an egress tunnel router, then sharing the keys with the egress tunnel router could cause a breach of security in the mapping system. Further, if an attacker intercepts the message and determines presence of a hashed value in the message, then sharing the keys with the egress tunnel router could help the attacker to reverse the hashing process and determine the original value of the nonce (n). Hence, not sharing the keys with the egress tunnel is designed to protect the messages from tampering by possible attackers who gained access to the egress tunnel router.

In an embodiment, a message sent to an egress tunnel router comprises a hash of the nonce. The nonce was used to encrypt an identity prefix and to generate HMAC. Neither the hash of the nonce nor the HMAC can be appreciated by the egress tunnel router.

In an embodiment, an egress tunnel router uses the hash of the nonce as a key to further encrypt a portion of a message before the egress tunnel router sends the message to an ingress tunnel router. The nonce hash included in a message received by the egress tunnel router from a mapping server can serve as an additional key. An example of using the hashed nonce by the egress tunnel router as the additional key is described in FIG. 3

Figure 3:
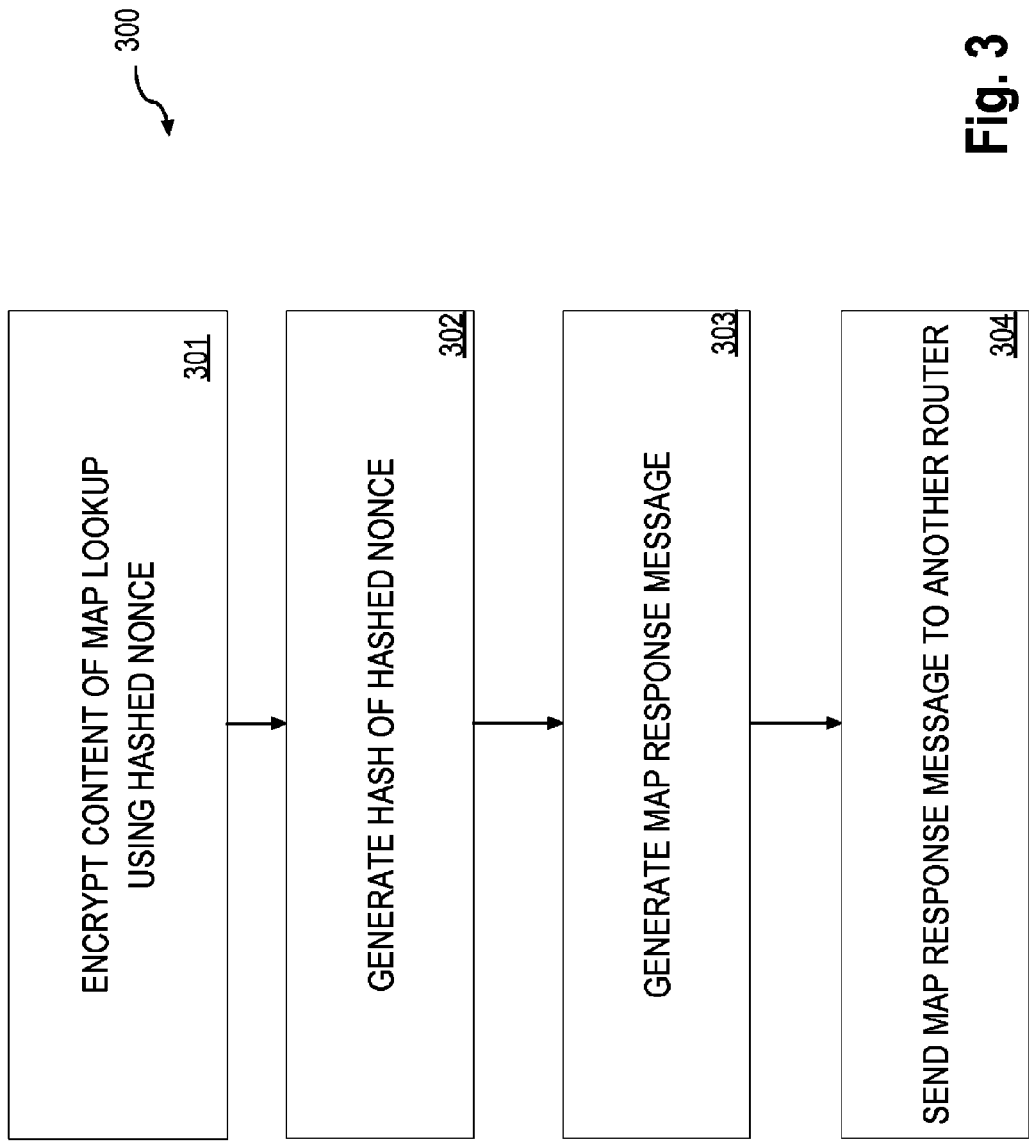
FIG. 3 illustrates one example of a method for securing a network address mapping system.

FIG. 3 illustrates one example of a method for securing a network address mapping system 300.

At block 301, an egress tunnel router uses a hashed nonce to encrypt content of a Map Lookup message. In an embodiment, the egress tunnel router uses the hashed nonce to secure content of the message before the message is transmitted from the egress tunnel router to an ingress tunnel router. The hashed nonce is used as a key to secure the connection between the egress tunnel router and the ingress tunnel router.

A nonce itself is used as a key to secure location information transmitted by a mapping server to an egress tunnel router, while a hashed nonce is used as another key to secure the connection between the egress tunnel router and the ingress tunnel router.

In an embodiment, a portion of the message that an egress tunnel router encrypts using a hashed nonce comprises identity information and/or location information that a mapping server obtained from a mapping for a particular identity. The location information can be already encrypted by the mapping server using a nonce. The egress tunnel router can use the hashed nonce to encrypt the already encrypted router location information included in the message received from the mapping server.

Since an egress tunnel router does not know the value of the original nonce, the egress tunnel router cannot decrypt the information encrypted by a map system. But, the egress tunnel router can encrypt the already once encrypted location information using a hashed nonce. The double-encrypted information that the egress tunnel router generated by encrypting the once-encrypted location information is referred herein as HMAC-2.

At block 302, an egress tunnel router generates a hash of the already hashed nonce. The egress tunnel generates the hash of the already hashed nonce to produce a hash of the hashed nonce. As described above, a first hash of the nonce can be generated by a mapping server. Upon receiving a Map Lookup message from the mapping server, the egress tunnel router can hash the hashed nonce again. The hash of the hashed nonce is referred herein as n"=h(h(n)).

At block 303, an egress tunnel router generates a Map Response message. The Map Response can comprise identity information (described above), a hash of the hashed nonce (n"=h(h(n))), once-encrypted location information that was encrypted by a mapping server using a nonce (HMAC-1), and double-encrypted location information that the egress tunnel router generated by encrypting the once-encrypted location information (HMAC-2). The message can be formatted as a Map Response message 411c, depicted in FIG. 4.

At block 304, an egress tunnel router sends the Map Response message to an ingress tunnel router. In an embodiment, the egress tunnel router sends a message comprising identity information, a hash of the hashed nonce (n"=h(h(n))), once-encrypted location information that was encrypted by a mapping server using a nonce (HMAC-1), and double-encrypted location information that the egress tunnel router generated by encrypting the once-encrypted location information (HMAC-2). The Map Response message 411c, depicted in FIG. 4.

Referring again to FIG. 1, at block 103, a first router (an ingress tunnel router) receives a Map Response message from a second router (an egress tunnel router).

In an embodiment, a Map Response comprises a double-hashed nonce (n"=h(h(n))), described above, a once-encrypted location information (HMAC-1), and a double-encrypted location information (HMAC-2), as depicted in FIG. 4 as a Map Response 411c.

At block 104, a first router determines whether the nonce is valid.

In response to sending a Map Lookup message with an identity and a nonce, a tunnel router receives a Map Response message. Based on the content of the Map Response message, the tunnel router determines whether the Map Response message is legitimate. For example, upon receiving a Map Response message in response to sending a Map Lookup message with a particular identity and a particular nonce, the tunnel router generates a hash of the nonce stored at the ingress tunnel router, and compares whether the generated hashed nonce matches the hashed nonce included in the Map Response message. If the nonces match, then the tunnel router determines that the Map Lookup message and the Map Response message were not intercepted by an adverse party, and that the communications were secure.

Since a nonce was shared between an ingress tunnel router and a mapping system, the ingress tunnel router can retrieve its own copy of a nonce, generate a hash of the nonce, and compare the hash of the nonce with the hashed nonce extracted from the received Mapping Response.

In an embodiment, the approach utilizing a nonce embedded in a Map Lookup and a Map Response allows determining whether the received Map Response message is an unsolicited Map Response message. If the nonce embedded in the Map Response message does not match the nonce in the Map Lookup for the same identity, then most likely the Map Response message was unsolicited and perhaps generated by an intruder.

Furthermore, using a nonce, an ingress tunnel router can decrypt encrypted location information (HMAC-1), and using a hashed nonce, the ingress tunnel router can decrypt double-encrypted location information (HMAC-2).

If the nonce is valid, then the process proceeds to executing step 106; otherwise, the process proceeds to executing step 105, in which the first router destroys the mapping if that is necessary.

At block 106, a first router establishes a Datagram Transport Layer Security (DTLS) session with a second router and sends a second Map Lookup directly to a second router. The DTLS protocol provides communications privacy for datagram protocols, such as UDP. DTLS allows datagram-based applications to communicate in a way that is designed to prevent eavesdropping, tampering, or message forgery. Establishing a DTLS session is described in FIG. 2.

Communication of data packets from nodes and tunnel routers can be also protected using GRE and IPsec.

At block 107, a first router determines whether a second router is authorized to communicate with a mapping system. The first router can be an ingress tunnel router, while the second router can be an egress tunnel router. One of the approaches for determining whether the second router is authorized to communicate with the mapping system is described in FIG. 2, below.

Referring again to FIG. 1, if the second router is authorized to communicate with a mapping system, then the process proceeds to executing step 109; otherwise, the process proceeds to executing step 108, in which the first router terminates a previously established secure session and destroys any mapping associated with the second router.

At block 109, a first router installs a mapping locally and sends one or more data packets to a node B. The mapping can comprise a mapping between identity and the location to indicate the device identifier associated with a location of the device.

Using a nonce allows validating whether a received Map Response message matches a previously sent Map Lookup message. Most likely, an intruder (attacker) is unaware of the nonce present in the messages and does not recognize a need for a nonce in the messages. Hence, even if he generates illegitimate Map Response messages, the messages would not comprise a valid nonce. The messages without a valid nonce could be easily identified by a mapping system as illegitimate.

For example, an intruder (attacker) intercepts a Map Lookup message with a particular identity, extracts the identity from the intercepted Map Lookup message; however, he does not recognize a nonce in the message. The intruder generates a Map Response message, associates the location information different from the actual location information of the device identified by the particular identity, and disseminates the generated Map Response message with the incorrect location information of the device. Once such a Map Response message is received by a tunnel router, then the tunnel router analyzes the content of the message, determines that the valid nonce is missing in the message and disregards the message. Hence, usage of the nonce provides a secure mechanism for exchanging information using the Map Lookup and Map Response message. However, in some applications, stronger security mechanisms may be required.

In an embodiment, a nonce-based security measures are enhanced by additional mechanisms that allow assuming that a mapping system cannot be trusted.

3.2 Securing a Network Address Mapping System Using a PKI-Key

In this section, it is assumed that a mapping system is not a trusted system. For example, when the mapping system is outsourced, maintained by a different organization, or maintained in a different country, the integrity of the system cannot be trusted. Maintaining the integrity of the mapping system may require implementing specific security mechanisms.

Figure 2:
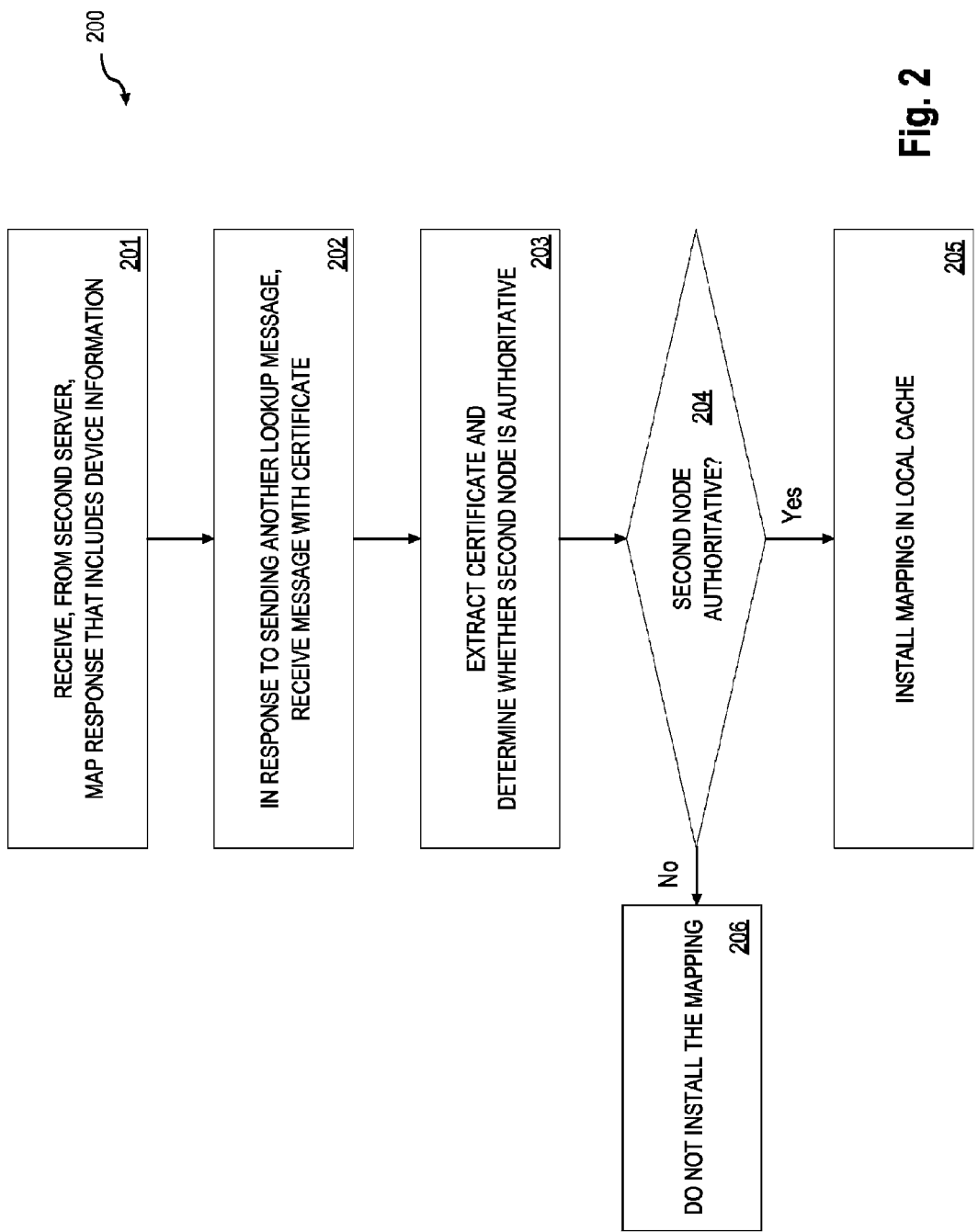
FIG. 2 illustrates one example of a method for securing a network address mapping system using a PKI-key.

FIG. 2 illustrates one example of a method for securing a network address mapping system 200 using a PKI-key.

In an embodiment, securing a mapping system 200 using the PKI key includes associating a certificate with egress tunnel routers.

In some cases, a router may not trust a mapping system, a destination mapping server or an egress tunnel router, which may be a part of the mapping system. For such cases, the router can try to verify a certificate of the mapping system device to determine whether the device is authorized to cooperate with the mapping system.

In an embodiment, one-time key security architecture is modified and extended to incorporate a PKI that provides strong authentication of the identity prefix owned by the router.

In an embodiment, an ingress tunnel router can request that an egress tunnel router proves that the egress tunnel router is indeed authorized to communicate messages to and from a mapping system. For example, the ingress tunnel router can request that the egress tunnel router provides its certificate to prove authorization of the egress tunnel router.

In an embodiment, when a router requests location information for a particular identity, the router transmits a Map Lookup message to a mapping system, and in response receives a Map Response message.

At block 201, a server, such as an ingress tunnel router, receives from an egress tunnel router a Map Response message that includes location information for a particular identity.

In an embodiment, a Map Response message contains a field that indicates to the router whether PKI-based security is supported.

If the router supports PKI-based security, then the router can transmit another Map Lookup message directly to the recently learned router's location via a Datagram Transport Layer Security (DTLS) session to request a certificate from the router. The Map Lookup message 411b, depicted in FIG. 4, comprises the identity and an indication that the server requested the certificate from the router.

In response to receiving a Map Lookup message, the router can include into a DTLS protocol datagram a certificate along with a full chain of trust steamed from a root of the Certification Authority (CA), and reply with a Map Response message.

At block 202, in response to sending another Map Lookup message to an egress tunnel router, an ingress tunnel router receives a message with a certificate.

At block 202, an ingress tunnel router extracts the certificate from the message and determines whether the egress tunnel router is authoritative. For example, the router can verify the certificate list and the chain of identity prefixes included in the certificate. Furthermore, the router can verify whether the identity prefix included in the message is a valid router certificate.

At block 204, if it is determined that the egress tunnel router is authoritative to communicate with a mapping system, then the process proceeds to step 205, in which the router can install the mapping, included in the previously received Map Response message, in its local cache. However, if it is determined that the egress tunnel router is not authoritative, then the process proceeds to step 206, in which the ingress tunnel router does not install the mapping, and optionally destroys the mapping.

In an embodiment, the PKI-based security approach allows to verify whether components of a mapping system are trusted. For example, if an egress tunnel router and an ingress tunnel router are located in different countries and the ingress tunnel router cannot be certain whether the egress tunnel router is trusted, then the presented PKI-based approach allows verifying whether the egress tunnel router can be indeed trusted. Only if the egress tunnel router can present a valid certificate (and a full chain of trust steamed from a root of the Certification Authority (CA), the egress tunnel router can be considered as a trusted entity.

In an embodiment, certificates are distributed to respective routers in advance and chains of trust are established at the time the certificates are distributed. For example, the certificates can be distributed using DTLS, and can involve exchanging several messages between the parties to provision the parties with the respective certificates.

In an embodiment, a mapping server acts as an egress tunnel router. The mapping server and the egress tunnel router can be equivalent devices. Therefore, the mapping server can also be provided with a certificate in advance.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
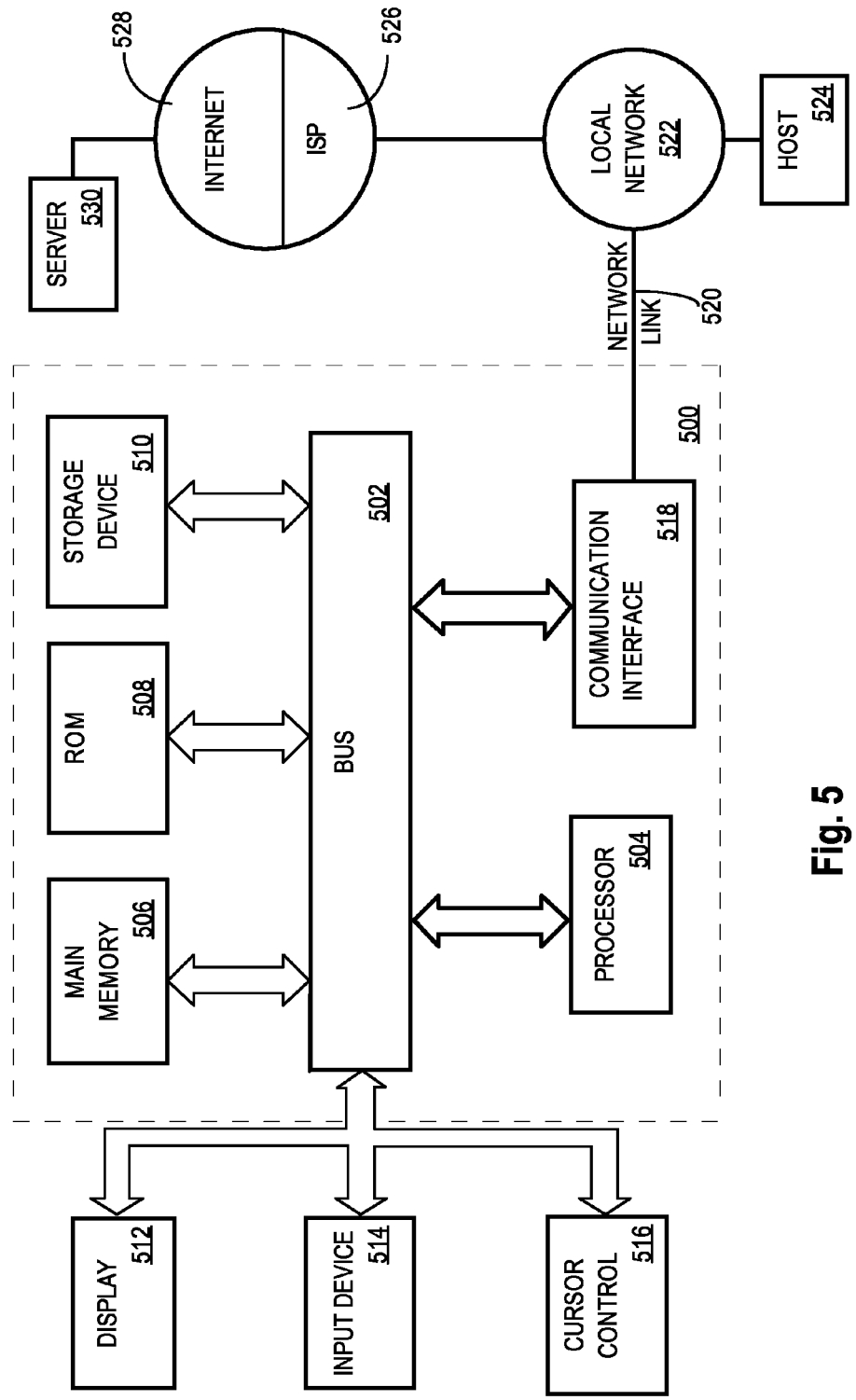
FIG. 5 illustrates one example of a computer system on which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

Embodiments include:

1. A method executed by a mapping server, the method comprising:
    at a mapping server that maintains a plurality of mappings that associate network device identifiers with network device locations:
        receiving a map lookup that includes a particular network device identifier and a first version of a cryptographic key;
        generating a second version of the cryptographic key;
        generating a plurality of address prefixes for which a router, associated with the particular network device identifier, is authoritative;
        sending, to the router, the second version of the cryptographic key and the plurality of address prefixes.

2. The method of Claim 1, wherein generating the plurality of address prefixes includes applying a hash function to the plurality of network address prefixes, wherein the hash function uses a cryptographic key as a hash key.

3. The method of Claim 1, wherein the map lookup originated from a first router in an attempt to send one or more packets to a network node associated with the particular device identifier.

4. The method of Claim 2, wherein the network node is associated with a particular address prefix in the plurality of address prefixes serviced by the router.

5. The method of Claim 4, further comprising, prior to the sending, establishing a DTLS session with the router, and sending, to the router based on the DTLS session, the second version of the cryptographic key and the plurality of address prefixes.

6. The method of Claim 1, further comprising based on the plurality of mappings, verifying that the particular device identifier corresponds to a particular device location or address prefix.

7. The method of Claim 1, further comprising receiving the map lookup from a mapping resolver configured to forward mapping requests from a plurality of other address prefixes.

8. A method executed by a mapping resolver, the method comprising:
    receiving, from a first router associated with a first network node, a map lookup that includes a particular device identifier associated with a second network node and a cryptographic key;
    forwarding the map lookup to a mapping server that maintains a plurality of mappings that associate device identifiers with device locations.

9. The method of Claim 8, further comprising, prior to receiving the mapping request, establishing a secure connection with the first router.

10. The method of Claim 9, wherein the secure connection is a DTLS connection.

11. The method of Claim 9, further comprising determining that the map lookup is invalid and sending a negative map response to the first router.

12. The method of Claim 9, wherein the first router and the second router are in separate address prefixes.

What is claimed is:

1. A method comprising:
    at a first router associated with a first network node:
        sending, to a mapping service that maintains a plurality of mappings that associate device identifiers with device locations, a first map lookup that includes a particular device identifier associated with a second network node;
        receiving, from a second router associated with the second network node, a map response that includes a particular device location that corresponds to the particular device identifier for the second network node;
        establishing a secure session between the first router and the second router;
        determining, based on the secure session, whether the second router is authorized to reply to the first map lookup that includes the particular device identifier associated with the second network node.

2. The method of claim 1, wherein determining whether the second router is authorized to reply for the particular device identifier includes receiving a chain of certificates through the secure session, and verifying that the chain includes a trusted root certificate.

3. The method of claim 1, wherein determining whether the second router is authorized to reply for the particular device identifier includes:
    receiving, through the secure session, an address prefix associated with the device identifier and a certificate of trust of the second router and indicating issuance from a certificate authority;
    verifying that the address prefix is included in the certificate of trust.

4. The method of claim 1, further comprising determining that the second router is not authorized to reply for the particular device identifier, and in response thereto, invalidating a previously stored local mapping that includes the second router.

5. The method of claim 1, further comprising determining that the second router is authorized to reply for the particular device identifier, and in response thereto, storing at the first router a local mapping that associates the particular device identifier with the particular device location.

6. The method of claim 5, further comprising communicating, on behalf of the first network node, with the second router based on the local mapping stored at the first router.

7. The method of claim 1, wherein the method is performed in response to receiving, from the first network node, one or more packets that identify, as a destination, the device identifier associated with the second network node.

8. The method of claim 1, further comprising including, in the first map lookup, a cryptographic key, and prior to establishing the secure session with the second router, verifying that the map response includes an expected version of the cryptographic key.

9. The method of claim 1, wherein determining whether the second router is authorized to reply for the particular device identifier associated with the second network node includes determining a validity of a public key received through the secure session from the second router.

10. A non-transitory computer-readable storage medium storing one or more sequences of instructions which, when executed by one or more processors, cause the one or more processors to perform at a router:
   at a first router associated with a first network address prefix:
      sending, to a second router, a first map lookup comprising a particular device identifier, and in response thereto, receiving, from the second router, a first map response comprising a particular mapping for the particular device identifier;
      wherein the second router maintains a plurality of mappings that associate device identifiers with device locations;
      sending, to the second router, a request to provide a certificate, and in response thereto, receiving, from the second router, a second map response;
      in response to determining that the second map response comprises the certificate, extracting the certificate from the second map response, and using the certificate to determine whether the second router is authoritative; and, in response to determining that the second router is authoritative, extracting the particular mapping from the first map response and installing the particular mapping at the first router.

11. The non-transitory computer-readable storage medium of claim 10, further comprising instructions which, when executed, cause the one or more processors to perform:
   in response to determining that the second map response does not comprise the certificate, discarding the particular mapping, provided in the first map response;
   in response to determining that the second map response comprises the certificate, but the second router is not authoritative, discarding the particular mapping, provided in the first map response.

12. The non-transitory computer-readable storage medium of claim 10, wherein the particular mapping is installed locally in a cache of the first router.

13. The non-transitory computer-readable storage medium of claim 10, wherein the second map response further comprises a full chain of trust steamed from a root of a Certification Authority (CA).

14. The non-transitory computer-readable storage medium of claim 10, wherein the particular mapping includes a port number, of the first router, through which a DTLS server is configured to communicate.

15. The non-transitory computer-readable storage medium of claim 14, wherein the second map response is a forwarded map response from a distributed mapping system and the network address prefixes, used in the sending are network address prefixes received at the first router.

16. The non-transitory computer-readable storage medium of claim 15, further comprising instructions which, when executed, cause the one or more processors to perform: receiving, from the second router, a request to establish a DTLS session based on the port number, and in response thereto, sending to the second router at least one certificate of trust, wherein the at least one certificate of trust includes the network address prefixes serviced by the first router.

17. The non-transitory computer-readable storage medium of claim 16, further comprising instructions which, when executed, cause the one or more processors to perform: receiving, from the second router, one or more packets that identify, as a destination for the one or more packets, a network node within the first network address prefix, and forwarding the one or more packets to the network node.

18. The non-transitory computer-readable storage medium of claim 17, further comprising instructions which, when executed, cause the one or more processors to perform: indicating to the second router that public key-based security is supported at the first router.

\* \* \* \* \*